May 11, 1926.
S. DAVENPORT
PLUG VALVE
Filed March 5, 1925
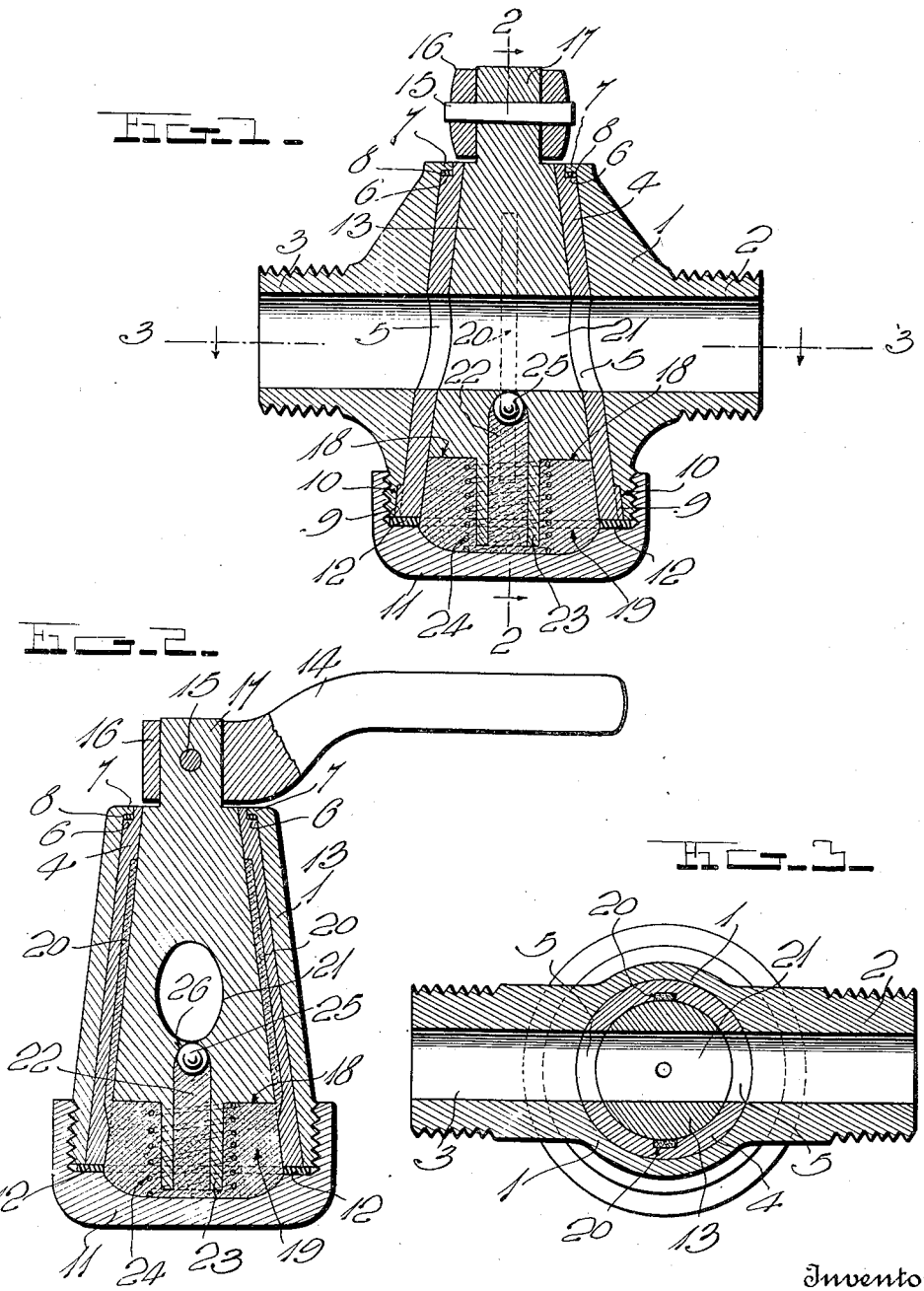
Inventor
S. Davenport
Witness
H. Woodard
By H. B. Willson & Co.
Attorneys Patented May 11, 1926.

1,584,699

UNITED STATES PATENT OFFICE.

STERLING DAVENPORT, OF JEROME, ARIZONA.

PLUG VALVE.

Application filed March 5, 1925. Serial No. 13,203.

My invention relates to improvements in the so-called plug valves of the type commonly used in connection with mining equipment, for controlling compressed air, steam and water, valves of this nature however, being also usable for numerous other purposes. Very often, the conditions under which the valves may be used, are such that they are subject to severe corrosion, often making it almost impossible to open or close them when necessary. It is the primary object of my invention however, to provide a new and improved construction, in which effective provision is made for lubrication, so that not only can the valve be easily moved from one position to another, but corrosion is prevented by the prevalence of the lubricant.

Another object is to provide a valve which may be quickly and easily disassembled for the insertion of a new bushing between the plug and the valve body, a closure for the lubricant-containing chamber serving to hold the bushing in place.

With the foregoing in view, the invention resides in the novel subject matter hereinafter described and claimed, the description being supplemented by the accompanying drawing.

Figure 1 is a longitudinal sectional view through the improved valve.

Figures 2 and 3 are additional sectional views as indicated by line 2—2 and 3—3 of Fig. 1.

In the drawing above briefly described, the numeral 1 designates a suitably constructed body having the usual or any preferred nipples or the like 2 and 3, one constituting an inlet and the other an outlet, the bore of the body being preferably provided with an appropriate removable bushing 4 which is of course formed with openings 5 for registration with the nipples 2 and 3. The bore and the bushing are provided at one end with co-acting shoulders 6 and 7 respectively, between which a gasket 8 is located, while at their other ends, said bore and bushing are formed with co-acting keys and keyways 9 and 10 respectively, which hold the bushing against rotation. A removable cap 11 is threaded onto the body 1 at one end of its bore, said cap serving to hold the bushing 4 in place, as well as giving access to a lubricant-containing chamber for the purpose of filling the latter. To prevent leakage, a gasket 12 is clamped between the cap 11 and the adjacent end of the bushing.

A valve plug 13 is rotatable within the bore of the bushing 4 and is provided at one end with an appropriate operating handle 14, which is detachably connected with the plug in any desired manner, for instance, by means of a tapered pin 15 passing through a socket 16 on one end of the handle and through a reduced extension 17 on one end of the valve plug. The other end 18 of this plug terminates in spaced relation with the cap 11, so that a grease containing chamber 19 is provided between the two, which chamber may be filled by removing said cap. Two grease outlet channels 20 have been shown leading from the chamber 19 and extending longitudinally of the bushing 4 and plug 13, said channels being preferably formed in said bushing as shown in Figs. 2 and 3.

The plug 13 is, of course, provided with the usual main port 21 for registration with the inlet and outlet 2—3, and in order that the fluid passing through this port may act against the contents of the chamber 19, when the valve is open, I provide the plug 13 with a branch port 22 which leads from the main port 21 to said chamber. In the preferred form of construction, the larger end of the plug 13, that is the end adjacent the cap 11, is provided with a relatively small, central, projecting portion 23, through which a portion of the port 22 extends, said projecting portion terminating in space relation with the cap 11 and acting as a positioning device for a plug seating spring 24 which surrounds it, as well as assisting in forming a cage for a ball check 25 within the branch port 22. This port is provided with a valve seat 26 which faces away from the main port 21 and is engaged by the ball valve 25 when the chamber 19 is being filled with grease, so that the entrance of grease into the port 21 is prevented.

When assembling, the valve may well be packed with grease at the factory, and when the cap 11 is threaded in place, not only will it securely hold the bushing 4 in its proper position, but some of the grease will be forced through the channels 20, in readiness to lubricate the plug and the wall of its receiving bore, when the valve is installed. Each time the valve is opened, any pressure whether compressed air, steam, gas, water, etc., in passing through the main port 21 will force upon the ball check 25 and consequently, the contents of the chamber 19 are subjected to this pressure, which insures that the channels 20 shall always be filled with the grease. In time, of course, the supply of grease from the chamber 19 will be exhausted and should be replenished, but there is no chance of any unnecessary leakage of grease and consequently, the supply will last for a great length of time. Whenever, it is necessary to replenish this supply, it is simply required that the cap 11 be removed and again replaced after the chamber 19 is filled.

In case the bushing 4 should become scored from any of the well known causes, the handle 14 may be removed and the cap 11 removed, whereupon the plug 13 may be withdrawn, the bushing 4 also withdrawn and a new bushing substituted in its place. At this point, attention may be directed to the fact that not only does the removable closure 11 form a closure for the grease chamber 19, but said closure 11 also constitutes means to secure the bushing 4 in place. By giving the single member 11 these two functions, it will be obvious that a great simplification has been effected in the construction of the valve.

With the ordinary forms of plug valves, it is customary to discard them entirely when they become so scored as to cause leakage, as the only way to prevent this leakage is to redress the wall of the plug-receiving bore, as well as repolishing the surface of the plug, for instance with emery cloth, and practically no mine is equipped with a machine of the type necessary for redressing the wall of the bore. By the use of my invention, a number of new bushings may be kept on hand and whenever a valve becomes a "leaker" or a "whistler", it is simply necessary to remove the old bushing, polish the plug with emery cloth or the like, and insert a new bushing. The valve is then in just as good condition as it was at the original time of installation. It will thus be seen that a valve has been provided of a nature to save the unnecessary expense of repeatedly replacing old valves with new ones.

As excellent results are obtainable from the details disclosed, they may well be followed. However, within the scope of the invention as claimed, modifications may of course be made.

I claim:

A plug valve comprising a body having a pressure inlet and an outlet and a tapered plug receiving bore extending transversely between said inlet and outlet, a tapered bushing in the bore of the body having opposed openings alined with the inlet and outlet, and a longitudinal groove in its inner face terminating inwardly from its ends, a tapered plug removably arranged within the bushing and having a port for registration with the inlet and outlet, said plug having its large end spaced inwardly from the adjacent end of the bushing to form a grease containing chamber, a central projecting portion on said large end having a bore opening through both ends and into said port, a valve seat at the port end of said last named bore, a ball valve seatable on said seat, a removable closure for the large end of the valve, a coiled spring encircling said projecting portion to snugly interengage the plug and bushing, and means for rotating said valve plug.

In testimony whereof I have hereunto affixed my signature.

STERLING DAVENPORT.